United States Patent
Yu et al.

(10) Patent No.: US 9,133,777 B2
(45) Date of Patent: Sep. 15, 2015

(54) ISG SYSTEM AND CONTROL METHOD THEREOF

(75) Inventors: Jiyong Yu, Pocheon-si (KR); Minyoung Jung, Hwaseong-si (KR); Sejun Kim, Seoul (KR); Junyong Lee, Hwaseong-si (KR); Daekwang Kim, Hwaseong-si (KR); Chikung Ahn, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 771 days.

(21) Appl. No.: 13/477,617

(22) Filed: May 22, 2012

(65) Prior Publication Data
US 2013/0138323 A1   May 30, 2013

(30) Foreign Application Priority Data
Nov. 30, 2011   (KR) .................. 10-2011-0126694

(51) Int. Cl.
| *F02D 17/04* | (2006.01) |
| *F02D 29/02* | (2006.01) |
| *F02N 11/08* | (2006.01) |

(52) U.S. Cl.
CPC ............... *F02D 17/04* (2013.01); *F02D 29/02* (2013.01); *F02N 11/0818* (2013.01); *F02N 2200/022* (2013.01); *F02N 2200/0801* (2013.01); *F02N 2200/102* (2013.01); *Y02T 10/48* (2013.01)

(58) Field of Classification Search
CPC ..... F02D 17/04; F02D 29/02; F02N 11/0818; F02N 2200/0801; F02N 2200/022; F02N 2200/102; Y02T 10/48
See application file for complete search history.

(56) References Cited

U.S. PATENT DOCUMENTS

| 6,532,926 B1 * | 3/2003 | Kuroda et al. ............. 123/179.4 |
| 2004/0159479 A1 * | 8/2004 | Morimoto et al. ........... 180/65.3 |
| 2009/0312933 A1 * | 12/2009 | Hoetzer ........................ 701/102 |
| 2011/0035137 A1 * | 2/2011 | Konishi et al. ................ 701/115 |
| 2012/0080001 A1 * | 4/2012 | Saito et al. .................. 123/179.4 |
| 2013/0191005 A1 * | 7/2013 | Hrovat et al. .................. 701/102 |
| 2013/0345952 A1 * | 12/2013 | Tsumori ........................ 701/113 |
| 2014/0244139 A1 * | 8/2014 | Asakura et al. ................ 701/110 |

FOREIGN PATENT DOCUMENTS

| JP | 6-257483 A | 9/1994 |
| JP | 2000-356147 A | 12/2000 |
| JP | 2004-116389 A | 4/2004 |
| JP | 2006-138283 A | 6/2006 |
| JP | 2008-309068 A | 12/2008 |

(Continued)

*Primary Examiner* — Hieu T Vo
*Assistant Examiner* — Sherman Manley
(74) *Attorney, Agent, or Firm* — Morgan, Lewis & Bockius LLP

(57) ABSTRACT

The ISG (Idle Stop & Go) system may include a vehicle information receiving unit receiving a vehicle information, and a control unit including an ISG operation logic which performs an idle stop when a preset idle stop condition is satisfied and restarts the engine when a preset restart condition of the engine is satisfied, and an ISG deactivation determination logic which determines whether a preset ISG deactivation condition is satisfied or not, based on the accumulated number of determinations that the idle stop condition is not satisfied, the accumulated number of idle stops, and the accumulated number of determinations that a performance time of the idle stop is smaller than a preset idle stop retention time, and deactivates the ISG operation logic when the ISG deactivation condition is satisfied.

6 Claims, 3 Drawing Sheets hesitation HESITATION OCCURS WHEN RESTARTING (ABOUT 0.5S)

(56) References Cited

FOREIGN PATENT DOCUMENTS

| JP | 2010-24887 A | 2/2010 |
| JP | 2010-248918 A | 11/2010 |
| JP | 2011-27072 A | 2/2011 |
| KR | 10-2005-0061125 A | 6/2005 |
| KR | 10-2005-0062935 A | 6/2005 |
| KR | 10-2009-0108422 A | 10/2009 |

* cited by examiner

ISG SYSTEM AND CONTROL METHOD THEREOF

CROSS-REFERENCE TO RELATED APPLICATIONS

The present application claims priority to Korean Patent Application Number 10-2011-0126694 filed Nov. 30, 2011, the entire contents of which application is incorporated herein for all purposes by this reference.

BACKGROUND OF THE INVENTION

1. Field of the Invention

The present invention relates to an idle stop & go (ISG) system, and more particularly, to an ISG system capable of enhancing driving convenience and fuel efficiency through the improvement of ISG logic.

2. Description of Related Art

An ISG system in the related art is an engine control system which automatically turns off an engine when an idle state of the engine is maintained during a predetermined time or more after a vehicle is stopped, and then automatically turns on the engine when a restart of the engine is requested by a driver's intention or a vehicle's condition.

That is, the ISG system turns off the engine in a preset stoppage delay time when the vehicle is stopped after driving in a state where an ISG operation condition is satisfied. Such an ISG-related condition is applied in the same manner, regardless of driving patterns.

However, even when a driver intends to temporarily stop the vehicle during driving without an idle stop, for example, when the vehicle is moved back and forth in a parking lot or is stopped by a stop signal in North America, the ISG system turns off the engine in case where the stoppage time satisfies the stoppage delay time condition of the ISG logic. Accordingly, the driving convenience is degraded.

Further, as shown in FIG. 1, the ISG system in the related art has problems in that, when the vehicle is restarted immediately after engine stop, hesitation is caused by starter drive, and fuel consumption for restart is increased by an unnecessary idle stop.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an ISG system which is capable of improving driving convenience and fuel efficiency by developing ISG logic capable of preventing an ISG operation which is not intended by a driver and reducing hesitation which occurs when a restart is performed immediately after an idle stop.

In an aspect of the present invention, an ISG system may include a vehicle information receiving unit receiving a vehicle information from outside, and a control unit including an ISG operation logic which determines whether a preset idle stop condition is satisfied or not, using the received vehicle information, performs an idle stop when the idle stop condition is satisfied, determines whether a preset restart condition of an engine is satisfied or not, using the vehicle information after performing the idle stop, and restarts the engine when the restart condition of the engine is satisfied.

The control unit may further include an ISG deactivation determination logic which accumulates the number of determinations that the idle stop condition is not satisfied, the number of idle stops, and the number of determinations that a performance time of the idle stop is smaller than a preset idle stop retention time, determines whether a preset ISG deactivation condition is satisfied or not, based on the accumulated number of determinations that the idle stop condition is not satisfied, the accumulated number of idle stops, and the accumulated number of determinations that a performance time of the idle stop is smaller than a preset idle stop retention time, and deactivates the ISG operation logic when the ISG deactivation condition is satisfied.

When the accumulated number of determinations that the idle stop condition is not satisfied is represented by 'a', the accumulated number of idle stops is represented by 'b', and the accumulated number of determinations that the performance time of the idle stop is smaller than the preset idle stop retention time is represented by 'c', the ISG deactivation determination logic may determine whether the ISG deactivation condition is satisfied or not, according to an operation result of a logic expression "$[b > E]$ and $[((a+c) \div (a+b)) > F]$" where E represents a predetermined number and F represents a predetermined ratio.

The ISG deactivation determination logic may reactivate the deactivated ISG operation logic, when the operation result of the logic expression is 'true', a travel distance of the vehicle information is larger than a preset critical travel distance, and a travel time of the vehicle information is larger than a preset critical travel time.

The idle stop condition may indicate that a stoppage condition where vehicle speed of the vehicle information is '0' and a brake signal of the vehicle information is 'ON' is satisfied, a retention time of the stoppage condition approaches a preset stoppage retention time, and a gear position of the vehicle information is maintained in a neutral state (N) or drive state (D).

In another aspect of the present invention, a control method of an ISG system, may include when an ISG function of the ISG system is activated, determining whether a preset idle stop condition is satisfied or not, by using a vehicle information received from outside, and accumulating the number of determinations that the idle stop condition is not satisfied when it is determined that the idle stop condition is not satisfied, when the idle stop condition is satisfied, performing an idle stop, and accumulating the number of idle stops, determining whether a preset restart condition of an engine is satisfied or not, using the vehicle information after performing the idle stop, and accumulating the number of determinations that a performance time of the idle stop is smaller than a preset idle stop retention time, when it is determined that the performance time of the idle stop is smaller than the preset idle stop retention time, restarting the engine when the restart condition of the engine is satisfied, and determining whether a preset ISG deactivation condition is satisfied or not, by using the accumulated number of determinations that the idle stop condition is not satisfied, the accumulated number of idle stops, and the accumulated number of determinations that the performance time of the idle stop is smaller than the preset idle stop retention time, and deactivating the ISG function when the ISG deactivation condition is satisfied.

When the accumulated number of determinations that the idle stop condition is not satisfied is represented by 'a', the accumulated number of idle stops is represented by 'b', and the accumulated number of determinations that the performance time of the idle stop is smaller than the preset idle stop retention time is represented by 'c', whether the ISG deactivation condition is satisfied or not may be determined according to an operation result of a logic expression "[b>E] and [((a+c)÷(a+b))>F]" where E represents a predetermined number and F represents a predetermined ratio.

When the operation result of the logic expression is 'true', a travel distance of the vehicle information is larger than a preset critical travel distance, and a travel time of the vehicle information is larger than a preset critical travel time, the deactivated ISG function may be reactivated.

The idle stop condition may indicate that a stoppage condition where vehicle speed of the vehicle information is '0' and a brake signal of the vehicle information is 'ON' is satisfied, a retention time of the stoppage condition approaches a preset stoppage retention time, and a gear position of the vehicle information is maintained in a neutral state (N) or drive state (D).

As such, the ISG system according to the exemplary embodiment of the present invention may improve driving convenience and fuel efficiency by preventing an ISG operation which is not intended by a driver and reducing hesitation which occurs when a restart is performed immediately after an idle stop.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
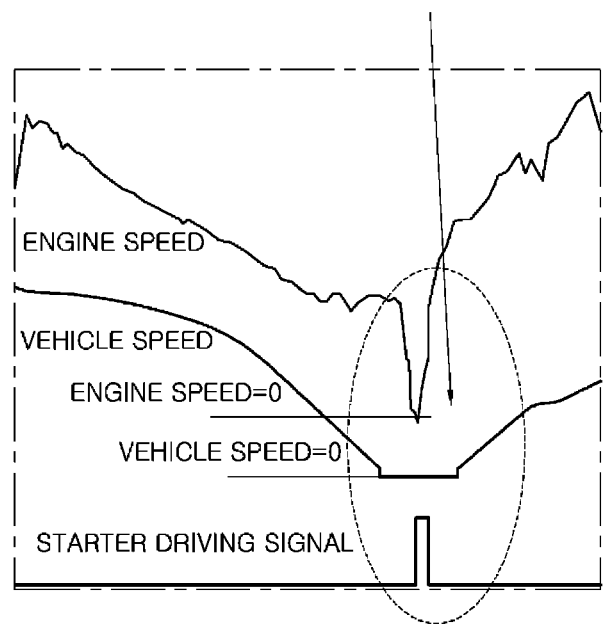
FIG. 1 is a waveform diagram based on an ISG system according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an ISG system according to an exemplary embodiment of the present invention will be described with reference to the accompanying drawings.

Figure 2:
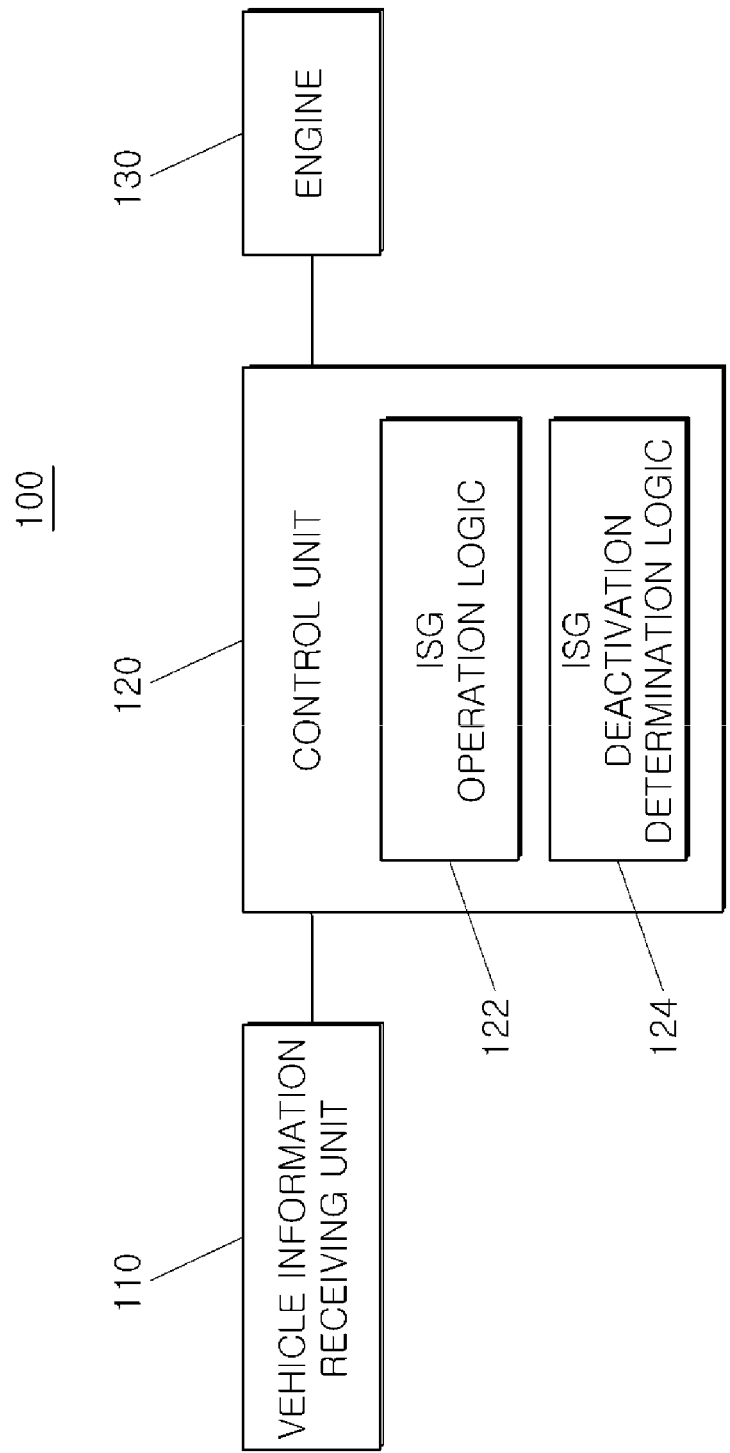
FIG. 2 is a block diagram of an ISG system according to an exemplary embodiment of the present invention.

FIG. 2 is a block diagram of an ISG system according to an exemplary embodiment of the present invention. Referring to FIG. 2, ISG system 100 according to the exemplary embodiment of the present invention may include a vehicle information receiving unit 110 for receiving vehicle information from outside, a control unit 120 for controlling an ISG operation of a vehicle, and an engine 130.

Vehicle information receiving unit 110 receives a variety of vehicle information from various electric devices mounted in the vehicle and transmits the vehicle information to control unit 120.

For convenience of description, control unit 120 may be divided into an ISG operation logic 122 and an ISG deactivation determination logic 124, based on the purport of the present invention. ISG deactivation determination logic 124 may determine whether or not to activate ISG operation logic 122, according to the state of the vehicle.

ISG operation logic 122 determines whether a preset idle stop condition is satisfied or not, using the received vehicle information. When the idle stop condition is satisfied, ISG operation logic 122 may perform an idle stop by turning off the engine.

Here, the idle stop condition may be defined as follows: a stoppage condition where a vehicle speed of the vehicle information is '0' and a brake signal of the vehicle information is 'ON' is satisfied, a retention time of the stoppage condition approaches a preset stoppage retention time, and a gear position of the vehicle information is maintained in a neutral state (N) or drive state (D).

ISG operation logic 122 determines whether a preset restart condition of engine 130 is satisfied or not, using the vehicle information after performing the idle stop. When the restart condition of the engine is satisfied, ISG operation logic 122 may restart the engine by turning on the engine.

Here, the restart condition of the engine may be satisfied when a start request of a driver, such as operation of an accelerator pedal, release of a brake pedal, or operation of a clutch pedal, is inputted through the vehicle information in a state where the engine is turned off.

ISG deactivation determination logic 124 is a logic for determining whether or not to deactivate ISG operation logic 122.

When ISG operation logic 122 determines that the idle stop condition is not satisfied, ISG deactivation determination logic 124 accumulates the number of determinations that the idle stop condition is not satisfied, where the accumulated number of determinations is represented by a. When an idle stop is performed, ISG deactivation determination logic 124 accumulates the number of idle stops, where the accumulated number of idle stops is represented by b. When it is determined that a performance time of the idle stop is smaller than a preset idle stop retention time B, ISG deactivation determination logic 124 accumulates the number of determinations that the performance time of the idle stop is smaller than the preset idle stop retention time B, where the accumulated number of determinations is represented by c.

ISG deactivation determination logic 124 determines whether a preset ISG deactivation condition is satisfied or not, using the accumulated operation condition data, that is, the accumulated number of determinations that the idle stop condition is not satisfied, which is represented by a, the accumulated number of idle stops represented by b, and the accumulated number of determinations that the performance time of the idle stop is smaller than the preset idle stop retention time, which is represented by c.

Specifically, ISG deactivation determination logic 124 may determine whether the ISG deactivation condition is satisfied or not, according to an operation result of a logic expression "[b>E] and [((a+c)÷(a+b))>F]" where E represents a predetermined number and F represents a predetermined ratio. As described above, the accumulated number of determinations that the idle stop condition is not satisfied is represented by 'a', the accumulated number of idle stops is represented by 'b', and the accumulated number of determinations that the performance time of the idle stop is smaller than the preset idle stop retention time B is represented by 'c'.

When the ISG deactivation condition is satisfied, ISG deactivation determination logic 124 may deactivate ISG operation logic 122.

When a preset condition is satisfied, ISG deactivation determination logic 124 may reactivate ISG operation logic 122 deactivated by the above-described logic. In other words, when the operation result of the logic expression is 'true', that is, ISG logic operation logic 122 is deactivated, a travel distance of the vehicle information is larger than a preset critical travel distance, and a travel time of the vehicle information is larger than a preset critical travel time, ISG deactivation determination logic 124 may reactivate ISG operation logic 122 which was deactivated because the ISG deactivation condition was not satisfied, that is, the operation result of the logic expression was set to 'false'.

Accordingly, ISG system 100 according to the exemplary embodiment of the present invention may prevent an ISG operation which is not intended by a driver, and reduce hesitation which occurs when a restart is performed immediately after an idle stop. Therefore, driving convenience and fuel efficiency may be improved.

Figure 3:
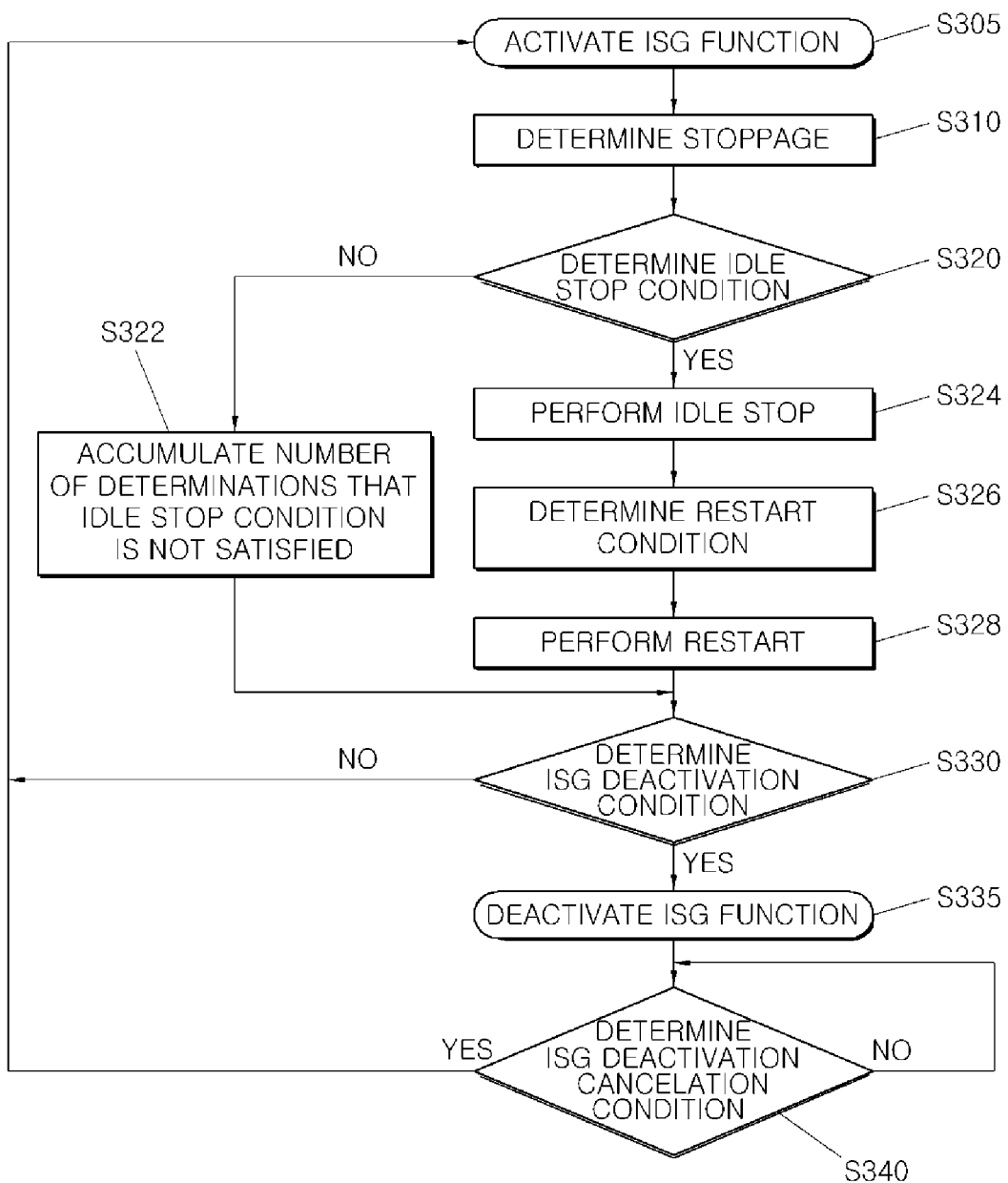
FIG. 3 is a control flow chart of the ISG system according to the exemplary embodiment of the present invention.

Hereinafter, the operation of the ISG system according to the exemplary embodiment of the present invention will be described with reference to FIG. 3. First, when the ISG function of ISG system 100 is activated, ISG system 100 determines whether a stoppage condition is satisfied or not, that is, whether or not vehicle speed of the vehicle information is '0' and a brake signal of the vehicle information is 'ON' (S310).

When it is determined that the stoppage condition is satisfied, ISG system 100 determines whether an idle stop condition is satisfied or not, that is, whether or not a retention time of the stoppage condition approaches a preset stoppage retention time and the gear position of the vehicle information is maintained in a neutral state (N) or drive state (D) (S320). When it is determined that the idle stop condition is not satisfied, ISG system 100 accumulates the number of determinations that the idle stop condition is not satisfied (S322), and proceeds to step S330 which will be described. Here, the idle stop condition indicates that the retention time of the stoppage condition approaches the preset stoppage retention time and the gear position of the vehicle information is maintained in a neutral state (N) or drive state (D).

As the determination result of step S320, when the idle stop condition is satisfied, ISG system 100 performs an idle stop, and accumulates the number of idle stops (S324).

Next, ISG system 100 determines whether a preset restart condition of the engine is satisfied or not, using the vehicle information after performing the idle stop. Then, ISG system 100 accumulates the number of determinations that a performance time of the idle stop is smaller than a preset idle stop retention time, when it is determined that the performance time of the idle stop is smaller than the preset idle stop retention time (S326).

Then, ISG system 100 restarts the engine when the restart condition of the engine is satisfied (S328).

Next, ISG system 100 determines whether a preset ISG deactivation condition is satisfied or not, using the accumulated number of determinations that the idle stop condition is not satisfied, the accumulated number of idle stops, and the accumulated number of determinations that the performance time of the idle stop is smaller than the preset idle stop retention time (S330). When the ISG deactivation condition is satisfied, ISG system 100 deactivates the ISG function (S335).

ISG system 100 determines whether an ISG deactivation cancellation condition is satisfied or not, that is, whether or not a travel distance of the vehicle information is larger than a preset critical travel distance and a travel time of the vehicle information is larger than a preset critical travel time, in a state where the ISG deactivation condition was satisfied (S340).

As the determination result of step S340, when the ISG deactivation cancellation condition is satisfied, ISG system 100 returns to step S305, and reactivates the deactivated ISG function.

The control method of the ISG system according to the exemplary embodiment of the present invention may prevent an ISG operation which is not intended by a driver, and reduce hesitation which occurs when a restart is performed immediately after an idle stop. Therefore, driving convenience and fuel efficiency may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An idle stop & go (ISG) system comprising:
   a vehicle information receiving unit receiving a vehicle information from outside; and
   a control unit including:
      an ISG operation logic which determines whether a preset idle stop condition is satisfied or not, by using the vehicle information received from the vehicle information receiving unit, performs an idle stop when the preset idle stop condition is satisfied, determines whether a preset restart condition of an engine is satisfied or not, using the vehicle information after performing the idle stop, and restarts the engine when the preset restart condition of the engine is satisfied; and
      an ISG deactivation determination logic which accumulates the number of determinations that the preset idle stop condition is not satisfied, the number of idle stops, and the number of determinations that a performance time of the idle stop is smaller than a preset idle stop retention time, determines whether a preset ISG deactivation condition is satisfied or not, based on the accumulated number of determinations that the preset idle stop condition is not satisfied, the accumulated number of the idle stops, and the accumulated number of determinations that the performance time of the idle stop is smaller than the preset idle stop retention time, and deactivates the ISG operation logic when the preset ISG deactivation condition is satisfied, wherein, when the accumulated number of determinations that the preset idle stop condition is not satisfied is represented by 'a', the accumulated number of the idle stops is represented by 'b', and the accumulated number of determinations that the performance time of the idle stop is smaller than the preset idle stop retention time is represented by 'c', the ISG deactivation determination logic determines whether the preset ISG deactivation condition is satisfied or not, according to an operation result of a logic expression "[b>E] and [((a+c)+(a+b))>F]" where E represents a predetermined number and F represents a predetermined ratio.

2. The ISG system as defined in claim 1, wherein the ISG deactivation determination logic reactivates the deactivated ISG operation logic, when the operation result of the logic expression is 'true', a travel distance of the vehicle information is larger than a preset critical travel distance, and a travel time of the vehicle information is larger than a preset critical travel time.

3. The ISG system as defined in claim 1, wherein the preset idle stop condition indicates that a stoppage condition where a vehicle speed of the vehicle information is '0' and a brake signal of the vehicle information is 'ON' is satisfied, a retention time of the stoppage condition approaches a preset stoppage retention time, and a gear position of the vehicle information is maintained in a neutral state (N) or a drive state (D).

4. A control method of an idle stop & go (ISG) system, comprising: when an ISG function of the ISG system is activated, determining whether a preset idle stop condition is satisfied or not, by using a vehicle information received from outside, and accumulating the number of determinations that the preset idle stop condition is not satisfied when it is determined that the preset idle stop condition is not satisfied; when the preset idle stop condition is satisfied, performing an idle stop, and accumulating the number of idle stops; determining whether a preset restart condition of an engine is satisfied or not, using the vehicle information after performing the idle stop, and accumulating the number of determinations that a performance time of the idle stop is smaller than a preset idle stop retention time, when it is determined that the performance time of the idle stop is smaller than the preset idle stop retention time; restarting the engine when the preset restart condition of the engine is satisfied; and determining whether a preset ISG deactivation condition is satisfied or not, by using the accumulated number of determinations that the preset idle stop condition is not satisfied, the accumulated number of the idle stops, and the accumulated number of determinations that the performance time of the idle stop is smaller than the preset idle stop retention time, and deactivating the ISG function when the preset ISG deactivation condition is satisfied, wherein, when the accumulated number of determinations that the preset idle stop condition is not satisfied is represented by 'a', the accumulated number of the idle stops is represented by 'b', and the accumulated number of determinations that the performance time of the idle stop is smaller than the preset idle stop retention time is represented by 'c', whether the preset ISG deactivation condition is satisfied or not is determined according to an operation result of a logic expression "[b>E] and [((a+c)+(a+b))>F]" where E represents a predetermined number and F represents a predetermined ratio.

5. The control method as defined in claim 4, wherein, when the operation result of the logic expression is 'true', a travel distance of the vehicle information is larger than a preset critical travel distance, and a travel time of the vehicle information is larger than a preset critical travel time, the deactivated ISG function is reactivated.

6. The control method as defined in claim 4, wherein the preset idle stop condition indicates that a stoppage condition where a vehicle speed of the vehicle information is '0' and a brake signal of the vehicle information is 'ON' is satisfied, a retention time of the stoppage condition approaches a preset stoppage retention time, and a gear position of the vehicle information is maintained in a neutral state (N) or a drive state (D).

* * * * *